(12) United States Patent
Hundt et al.

(10) Patent No.: US 6,817,014 B2
(45) Date of Patent: Nov. 9, 2004

(54) ANALYSIS OF EXECUTABLE PROGRAM CODE USING COMPILER-GENERATED FUNCTION ENTRY POINTS AND ENDPOINTS WITH OTHER SOURCES OF FUNCTION ENTRY POINTS AND ENDPOINTS

(75) Inventors: Robert Hundt, Sunnyvale, CA (US); Vinodha Ramasamy, Santa Clara, CA (US); Jose German Rivera, Sunnyvale, CA (US); Umesh Krishnaswamy, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 494 days.

(21) Appl. No.: 09/833,249

(22) Filed: Apr. 11, 2001

(65) Prior Publication Data

US 2004/0015883 A1 Jan. 22, 2004

(51) Int. Cl.[7] .................................................. G06F 9/45
(52) U.S. Cl. ........................ 717/159; 717/157; 717/151
(58) Field of Search ................................. 717/159, 157, 717/151

(56) References Cited

U.S. PATENT DOCUMENTS

| | | | | |
|---|---|---|---|---|
| 5,394,547 A | * | 2/1995 | Correnti et al. ............. | 717/175 |
| 5,481,713 A | * | 1/1996 | Wetmore et al. ............ | 717/170 |
| 5,491,808 A | * | 2/1996 | Geist, Jr. .................... | 711/100 |
| 5,761,477 A | * | 6/1998 | Wahbe et al. ................... | 709/1 |
| 5,842,017 A | * | 11/1998 | Hookway et al. ........... | 717/158 |
| 5,940,618 A | * | 8/1999 | Blandy et al. .............. | 717/128 |
| 5,966,537 A | * | 10/1999 | Ravichandran ............. | 717/158 |
| 5,966,539 A | * | 10/1999 | Srivastava .................. | 717/156 |
| 5,999,737 A | * | 12/1999 | Srivastava .................. | 717/162 |
| 6,011,919 A | * | 1/2000 | Politis et al. ............... | 717/114 |
| 6,026,235 A | * | 2/2000 | Shaughnessy ............... | 717/127 |
| 6,044,224 A | * | 3/2000 | Radia et al. ................. | 717/162 |
| 6,072,951 A | * | 6/2000 | Donovan et al. ........... | 717/158 |
| 6,090,155 A | * | 7/2000 | Donovan et al. ........... | 717/158 |
| 6,092,180 A | * | 7/2000 | Anderson et al. ........... | 712/200 |
| 6,154,876 A | * | 11/2000 | Haley et al. ................. | 717/133 |
| 6,182,283 B1 | * | 1/2001 | Thomson .................... | 717/153 |
| 6,189,141 B1 | * | 2/2001 | Benitez et al. .............. | 717/153 |
| 6,269,477 B1 | * | 7/2001 | Fitzgerald et al. .......... | 717/131 |
| 6,311,324 B1 | * | 10/2001 | Smith et al. ................. | 717/114 |
| 6,311,326 B1 | * | 10/2001 | Shagam ....................... | 717/128 |
| 6,317,870 B1 | * | 11/2001 | Mattson, Jr. ................. | 717/151 |
| 6,327,699 B1 | * | 12/2001 | Larus et al. ................. | 717/128 |
| 6,341,371 B1 | * | 1/2002 | Tandri ......................... | 717/158 |
| 6,654,793 B1 | * | 11/2003 | Wollrath et al. ............ | 709/217 |
| 6,665,671 B2 | * | 12/2003 | Coutant ......................... | 707/8 |
| 6,698,015 B1 | * | 2/2004 | Moberg et al. ............. | 717/154 |
| 6,708,330 B1 | * | 3/2004 | Moberg et al. ............. | 717/158 |

OTHER PUBLICATIONS

Compilers Principles, Techniques and Tools, Aho et al, Chapters 1–2, Sep. 12, 1885.*
Microsoft Visual C++ Professional Tools User's Guides Source Profiler version 1.0, Microsoft Documentation, pp. 1–72, 1993.*

(List continued on next page.)

Srivastava, Amitabh, and Eustace, Alan, *ATOM A System for Building Customized Program Analysis Tools*, Digital Equipment Western Research Laboratory, pp. 196–205.

Primary Examiner—Todd Ingberg

(57) ABSTRACT

Method and apparatus for analysis of executable program code. The executable program includes segments of code that correspond to callable functions in the source code from which the executable code was generated. Compiler-generated checkpoint descriptors are included in the executable and include pairs of entry points and endpoints. Each pair of entry points and endpoints is associated with a callable function in the source code. The pairs of entry points and endpoints are read from the executable program code and used to generate analysis data for the associated functions. In other embodiments, pairs of entry points and endpoints are additionally assembled from dynamic load modules and symbol tables.

13 Claims, 3 Drawing Sheets

OTHER PUBLICATIONS

"Turbo Profiler 2.0 User's Guide", Borland Corporation, pp. 1–226, 1991.*

"IBM Research Reprt DAISY Dynamic Compilation for 100% Architectural Compatibilty", Kernal Ebcioglu et al, IBM Research, Aug. 5, 1996.*

"SHADE: A Fast Instruction–Set Simulator for Execution Profiling", Bob Cmelik et al, ACM, pp. 128–136, 1994.*

"An Execution Profiler for Modular Programs", S.L. Graham et al, published John Wiley & Sons, Mar. 10, 1983, pp. 671–685.*

"Interprocedural Optimization Eliminating Unnecessary Recompilation", M. Burke et al, IBM Research, ACM pp. 367–399, vol 15, No. 3, Jul. 1993.*

"Trace–directed program restructuring for AIX executables", R.R. Heisch, IBM Research, Sep. 1994.*

"Using Profile Information to Assist Classic Code Optimization", P.F. Chang et al, Published by John wiley & Sons Ltd., Jun. 25, 1991 pp. 1301–1321.*

Compilers Principles, Techniques and Tools, Aho et al, pp. 473 478, published Sep. 12, 1985.*

Miller et al., *The Paradyn Parallel Performance Measurement Tools*, IEEE Computer 28, Nov. 11, 1995, pp. 1–22.

* cited by examiner

ANALYSIS OF EXECUTABLE PROGRAM CODE USING COMPILER-GENERATED FUNCTION ENTRY POINTS AND ENDPOINTS WITH OTHER SOURCES OF FUNCTION ENTRY POINTS AND ENDPOINTS

FIELD OF THE INVENTION

The present invention generally relates to analysis of executable program code, and more particularly to finding entry points and endpoints of functions in support of program analysis.

BACKGROUND

Analysis of binary executable programs is performed to analyze program performance, verify correctness, and test correct runtime operation, for example. Some analyses are performed prior to runtime (static analysis), while other analyses are performed during runtime (dynamic analysis). For both static and dynamic analysis, however, the analysis may be performed at the function level.

The term, "function", refers to named sections of code that are callable in the source program and encompasses routines, procedures, methods and other similar constructs known to those skilled in the art. The functions in the source code are compiled into segments of executable code. For convenience, the segments of executable code that correspond to the functions in the source code are also referred to as "functions".

A function is a set of instructions beginning at an entry point and ending at an endpoint. The entry point is the address at which execution of the function begins as the target of a branch instruction. The endpoint is the instruction of the function from which control is returned to the point in the program at which the function was initiated. For functions having multiple entry points and/or multiple endpoints, the first entry point and the last endpoint define a function.

The function entry points and endpoints of a program have in the past been obtained from symbol tables that are associated with the executable program code and from debug information that is present with the file having the executable program code (an "executable"). The debug information includes, for example, types of data entities, names of data entities, and the relationship between source and binary code. A symbol table contains a mapping of symbolic names of functions to entry points of the functions. However, since the generation of debug information is selectable at the compilation stage, some executables do not have debug information. Similarly, the presence of symbol tables is often optional, since in most environments a symbol table is unnecessary to run an executable. Thus, effective analysis of an executable presently depends on whether there is sufficient debug information or a complete symbol table.

A system and method that address the aforementioned problems, as well as other related problems, are therefore desirable.

SUMMARY OF THE INVENTION

The present invention provides in various embodiments a method and apparatus for analysis of executable program code. The executable program includes segments of code that correspond to callable functions in the source code from which the executable code was generated. Compiler-generated checkpoint descriptors are included in the executable and include pairs of entry points and endpoints. Each pair of entry points and endpoints is associated with a callable function in the source code. The pairs of entry points and endpoints are read from the executable program code and used to generate analysis data for the associated functions. In other embodiments, pairs of entry points and endpoints are additionally assembled from dynamic load modules and symbol tables.

It will be appreciated that various other embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments, the present invention uses compiler-generated checkpoints to identify function entry points and endpoints in executable program code. The function entry points and end-points are then used to support analysis of the executable program code. Compiler-generated checkpointing is described in the patent/application entitled, "COMPILER-BASED CHECKPOINTING FOR SUPPORT OF ERROR RECOVERY", by Thompson et al., filed on Oct. 31, 2000, and having patent/application Ser. No. 09/702,590, the contents of which are incorporated herein by reference.

The process by which the compiler generates checkpoints generally entails identifying the points of program execution at which checkpoints are appropriate, and generating object code to implement the checkpoints. The checkpoints are identified at function boundaries. The executable program code is generated, along with executable checkpoint code. Generally, the executable checkpoint code saves the state of data objects to be recovered in the event of a hardware failure or a software exception, for example a C++ exception. A data structure is created to manage the data saved at each checkpoint in relation to the checkpoints in the program code. Since the checkpoints save the state of possibly different sets of data objects ("checkpoint data set"), each checkpoint has associated storage for state of the associated checkpoint data set.

Figure 1:
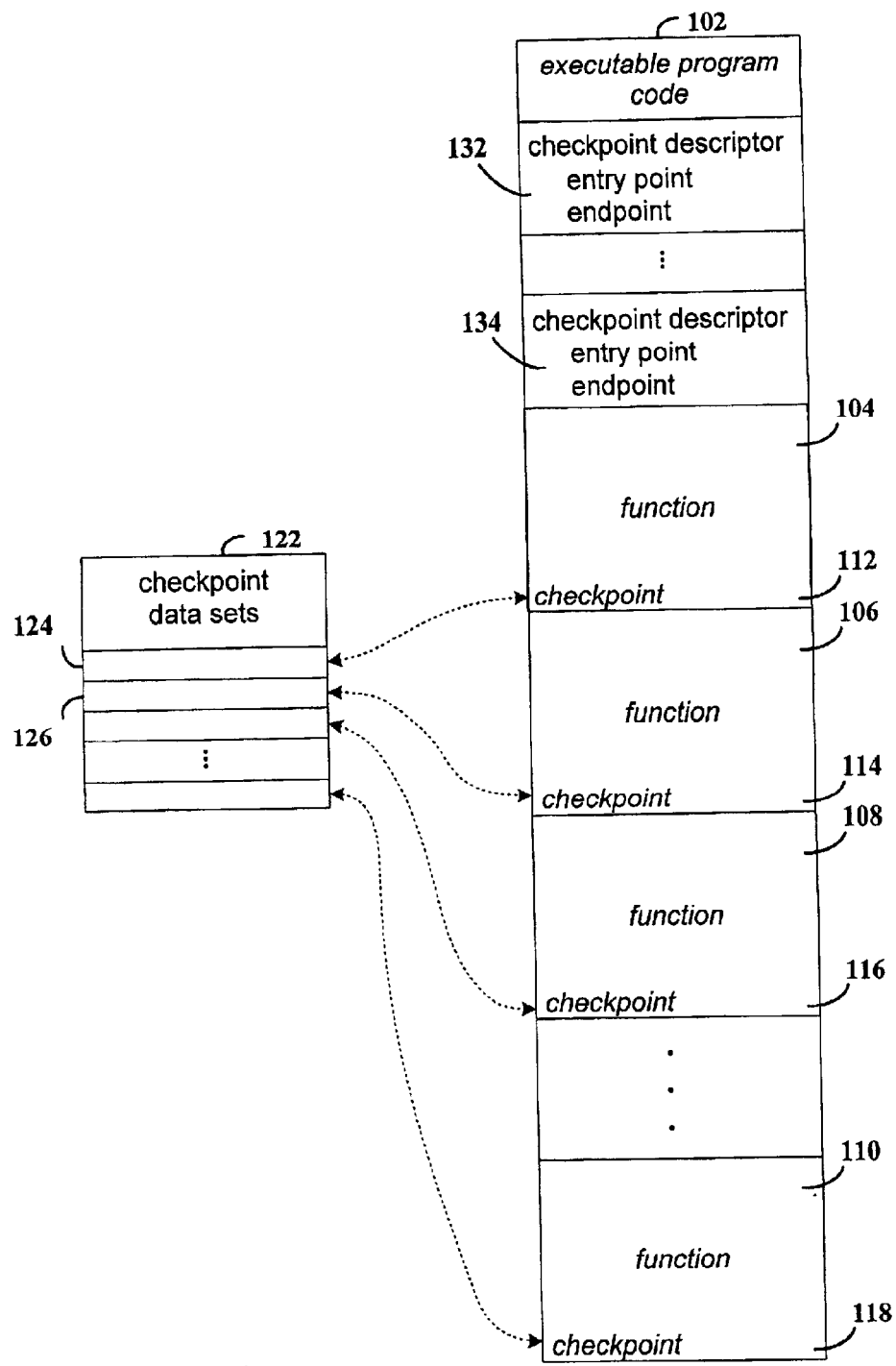
FIG. 1 is a block diagram that illustrates an example data structure used in the management of checkpoints.

FIG. 1 is a block diagram that illustrates an example data structure used in the management of checkpoints. Checkpoints in executable program code 102 delineate the constituent functions. In the example code, functions 104, 106, 108, and 110 have the associated checkpoints 112, 114, 116, and 118. The labels at the checkpoints represent the checkpoint code (or branch) that is executed to save checkpoint data.

Checkpoint data sets 122 includes a checkpoint data set for each of the checkpoints. For example, checkpoint 112 is associated with data set 124, and checkpoint 114 is associated with checkpoint data set 126.

Each checkpoint data set includes storage for the state of the data objects that are recorded at the associated checkpoint. It will be appreciated that for recovery purposes each of checkpoint data sets 122 may also include references (not shown) to the data objects that are associated with the state data.

For each function in the source code, the compiler generates an associated checkpoint descriptor. The term, "function", refers to named sections of code that are callable in the source program and encompasses routines, procedures, methods and other similar constructs known to those skilled in the art. The functions in the source code are compiled into segments of executable code. For convenience, the segments of executable code that correspond to the source code functions are labeled with "function" in FIG. 1.

As described in the referenced patent/application, the checkpoints can be used for recovery in the event of program failure. Relative to the present invention, the checkpoint descriptors 132 and 134 that are generated by the compiler are used in identifying functions and then generating analysis data for the functions. For example, checkpoint descriptor 132 is associated with function 104, and checkpoint descriptor 134 is associated with function 110. The checkpoint descriptors are stored in the executable program code file, which is also referred to as the "executable" or ELF (executable load file).

Each checkpoint descriptor includes an entry point and an endpoint. The entry point is the starting address of the associated function, and the endpoint is the address at which the function exits execution.

Figure 2:
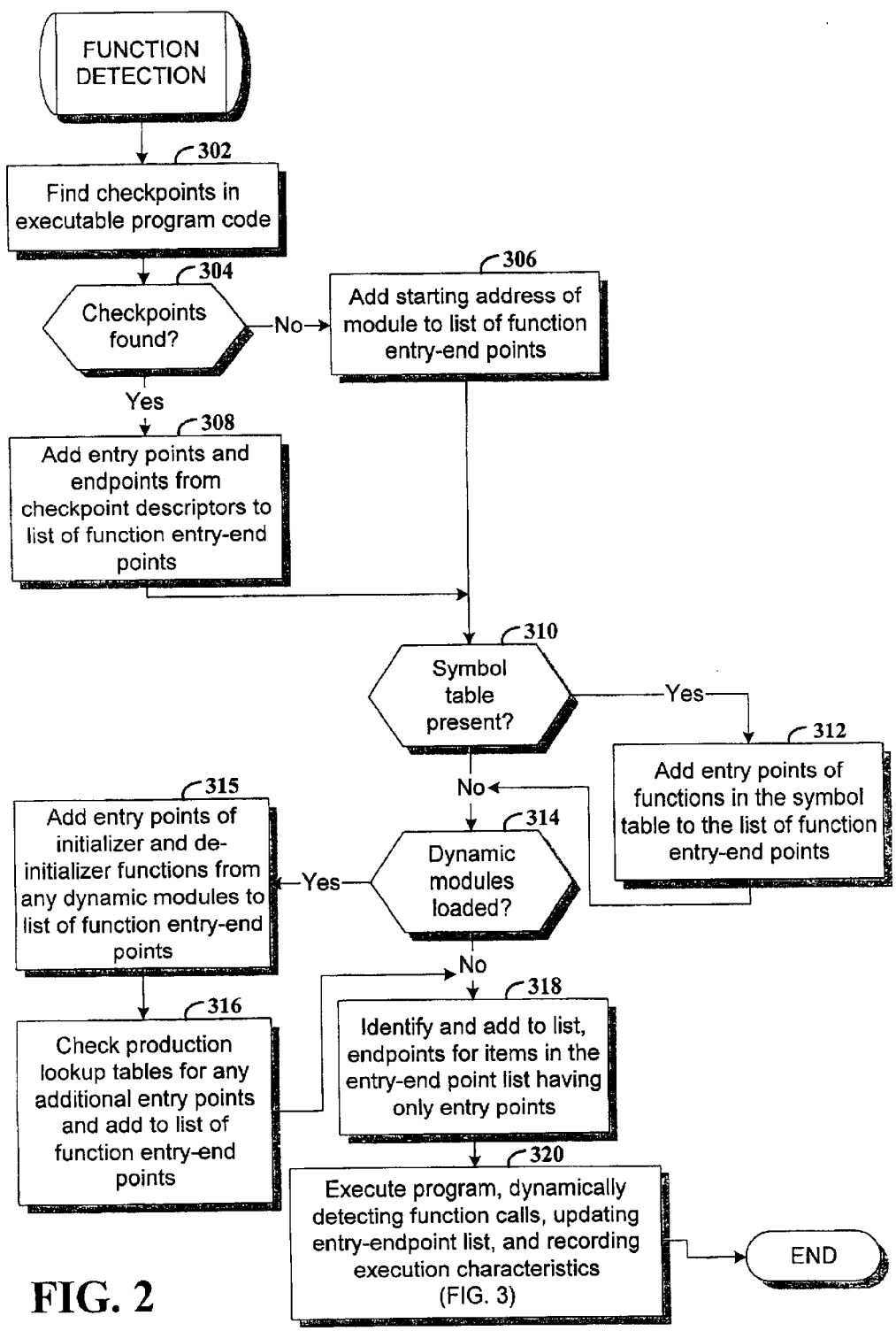
FIG. 2 is a flowchart of a process for finding function entry points and endpoints in executable program code in accordance with one embodiment of the invention.

FIG. 2 is a flowchart of a process for finding function entry points and endpoints in executable program code in accordance with one embodiment of the invention. The process generally entails generating a list of pairs of entry points and endpoints of the functions in the executable. This list is referred to herein as the list of function entry-end points. The entry points of the functions are gathered from various sources, including for example, checkpoint descriptors generated in compilation of the code, a symbol table, and any dynamic load modules associated with the executable.

At step 302, the process searches for checkpoints in the executable program code 102 by looking for checkpoint descriptors (e.g., 132 and 134 of FIG. 1). If the executable does not contain any checkpoint descriptors, decision step 304 directs the process to step 306, where the starting address of the executable is added to the list of function entry-end points. The endpoint of the executable is the end of the binary segment. If checkpoint descriptors are found in the executable, at step 308 the entry points and associated end-points are read from the checkpoint descriptors and stored in the list of entry-end points. The process then continues at decision step 310.

Decision step 312 tests whether a symbol table is present for the executable. In many environments, a symbol table is optionally created during compilation of program source code at the discretion of the user. The symbol table includes a mapping of the symbolic names of functions in the executable to the function entry-points. If the symbol table is present, the process is directed to step 312, and the entry points from the symbol table are added to the list of function entry-end points. Otherwise, the process is directed to decision step 314.

Decision step 314 tests whether there are any dynamic load modules present with the executable. If so the process is directed to step 315. At step 315, the entry points of the initializer and de-initializer functions in the dynamic load modules are added to the list of entry-end points. The ending addresses of the binary segments are used as the endpoints of the initializer and de-initializer functions. At step 316, the production lookup tables (PLTs) associated with the dynamic load modules are checked for any additional functions. Any functions that are exported from a dynamic load module are identified in the associated PLT.

After step 316, or if there are no dynamic load modules loaded, the process is directed to step 318. At step 318 endpoints are identified for the entry points in the list. It will be appreciated that thus far, the only source of endpoints is checkpoint descriptors in the executable. If there are no checkpoint descriptors, no endpoints will be present in the list of entry-endpoints. Endpoints are identified and associated with those entry points in the list that do not have endpoints. The endpoints are determined using the function entry points in the list. For example, for an entry point $p_1$ of a function $f_1$ that precedes a function $f_2$ in the executable, where $f_2$ has an entry point $p_2$, the endpoint of $f_1$ can be determined by a known offset back from the entry point $f_2$ of $p_2$. For entry points for which endpoints cannot be identified, the end of the code segment is used for the respective endpoints.

At this juncture, the static detection of function entry points and endpoints is complete and static analysis of the executable can be performed. Further function detection can be performed at runtime. At step 320, the program is executed and function calls are detected. Function calls are characterized by execution of a branch instruction, for example, and the target address of the branch is the function entry point. Entry points detected at runtime are added to the list of entry-end points. Various runtime characteristics of the functions are recorded in accordance with the user-selected analysis.

The list of function entry points and endpoints supports various forms of binary analysis. Some example analyses supported by the present invention are described in the following paragraphs.

Disassembly of an executable can use the function entry points and endpoints to translate calls to addresses into calls to functions and output function calls, which are descriptive, instead of jumps addresses. In addition, individual functions can be disassembled without having to disassemble the entire executable.

The identification of function entry points and endpoints supports completeness and containment analysis. For example, it is possible to verify the existence of a given function in a load module.

A function matching technique can be employed with reference to the function entry points, endpoints, and executable code to detect copyright infringement. Analysis involving static instrumentation is also supported by the present invention.

Reverse engineering tools can also benefit from identification of function entry points and endpoints. For example, these tools attempt to generate a high-level language representation of an executable, which generally use constructs such as functions.

Figure 3:
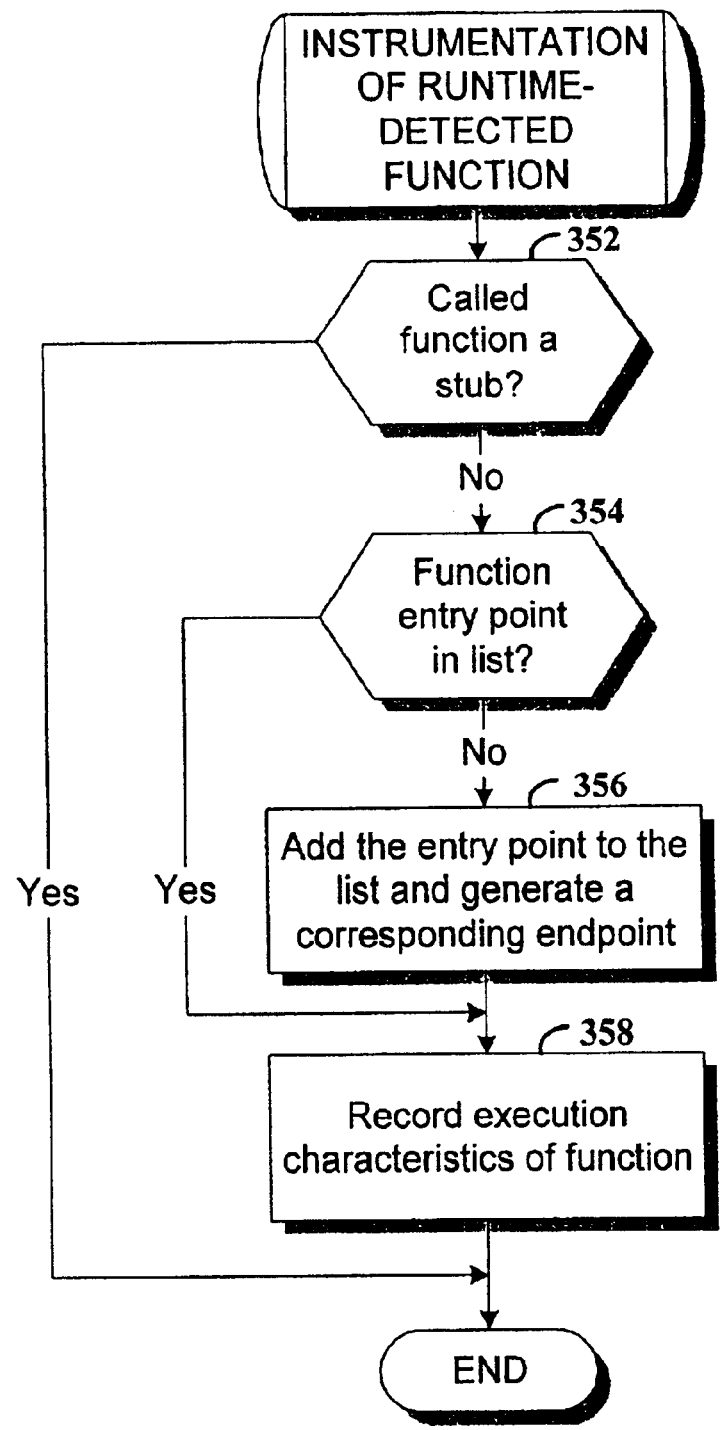
FIG. 3 is a flowchart of a process for analysis of a runtime detected function call.

FIG. 3 is a flowchart of a process for analysis of a runtime detected function call. As described previously, a function call can be detected by execution of a branch instruction, for example. Upon detection, decision step 352 tests whether the called function is a stub function. A stub function is a segment of code that is target of a branch instruction and that does not return control to the point following the branch instruction after execution of the stub code segment. Stub functions can be detected using the symbol table, pattern matching, or searching for a "return" instruction in the code segment. For a stub function, the entry point is not saved and no analysis is performed.

Decision step 352 directs the process to decision step 354 for non-stub function calls. Decision step 354 tests whether the function entry point is already in the list of entry-endpoints. If not, the entry point is added to the list and a corresponding endpoint is generated at step 356. The endpoint is also added to the list. At step 358, selected execution characteristics of the function are recorded. It will be appreciated that the particular characteristics recorded depend on the user-selected analysis. This process is repeated for each detected function call.

Other aspects and embodiments of the present invention, in addition to those described above, will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for analysis of executable program code, the executable program including segments of code that correspond to callable functions in source code from which the executable code was generated, comprising:

reading from the executable program code pairs of entry points and endpoints, each pair including an entry point and an endpoint that are associated with a callable function in the source code and corresponding to a segment of the executable program code;

generating analysis data for the functions identified by the pairs of entry points and end points;

detecting execution of stub functions at runtime; and bypassing analysis of stub functions.

2. The method of claim 1, further comprising scanning the executable program code for selected characteristics using the pairs of entry points and endpoints.

3. The method of claim 1, further comprising:

executing the program code;

detecting execution of the functions using the pairs of entry points and endpoints; and recording selected execution characteristics of each executed function.

4. The method of claim 1, wherein the executable program code includes one or more dynamic load modules, the method further comprising:

reading entry points of initializer and deinitializer functions from dynamic load modules;

pairing the entry points of the initializer and deinitializer functions with endpoints of the initializer and deinitializer functions; and generating analysis data for the initializer and de-initializer functions identified by the pairs of entry points and end points of the initializer and deinitializer functions.

5. The method of claim 4, wherein the executable program code includes a procedure lockup table (PLT) table associated with the one or more dynamic load modules, the method further comprising:

reading function entry points from the PLT;

pairing the entry points from the PLT with endpoints; and generating analysis data for the PLT functions identified by the pairs of entry points and end points of the PLT functions.

6. The method of claim 4, further comprising scanning the executable program code for selected characteristics using the pairs of entry points and endpoints.

7. The method of claim 4, further comprising:

executing the program code;

detecting execution of the functions using the pairs of entry points and endpoints; and recording selected execution characteristics of each executed function.

8. The method of claim 4, wherein the program code includes a symbol table identifying one or more function entry points, the method further comprising:

reading entry points of functions from the symbol table;

pairing the entry points from the symbol table with endpoints; and generating analysis data for the symbol table functions identified by the pairs of entry points and end points of the symbol table functions.

9. The method of claim 1, wherein the program code includes a symbol table identifying one or more function entry points, the method further comprising:

reading entry points of functions from the symbol table;

pairing the entry points from the symbol table with endpoints; and generating analysis data for the symbol table functions identified by the pairs of entry points and end points of the symbol table functions.

10. The method of claim 1, further comprising:

detecting function calls at runtime;

finding the entry point of a runtime-detected function call;

pairing an endpoint with the entry point of a runtime-detected function call; and generating analysis data for functions identified by pairs of entry points and end points of the runtime-detected function calls.

11. The method of claim 10, wherein the executable program code includes one or more dynamic load modules, the method further comprising:

reading entry points of initializer and deinitializer functions from dynamic load modules;

pairing the entry points of the initializer and deinitializer functions with endpoints of the initializer and deinitializer functions; and generating analysis data for the initializer and de-initializer functions identified by the pairs of entry points and end points of the initializer and deinitializer functions.

12. The method of claim 11, wherein the executable program code includes a procedure lookup table (PLT) table associated with the one or more dynamic load modules, the method further comprising:

reading function entry points from the PLT;

pairing the entry points from the PLT with endpoints; and generating analysis data for the PLT functions identified by the pairs of entry points and end points of the PLT functions.

13. An apparatus for analysis of executable program code, the executable program including segments of code that correspond to callable functions in source code from which the executable code was generated, comprising:

means for reading from the executable program code pairs of entry points and endpoints, each pair including an entry point and an endpoint that are associated with a callable function in the source code and corresponding to a segment of the executable program code;

means for generating analysis data for the functions identified by the pairs of entry points and end points;

means for detecting execution of stub functions at runtime; and means for bypassing analysis of stub functions.

* * * * *